United States Patent [19]

Maziarz

[11] Patent Number: 4,684,083
[45] Date of Patent: Aug. 4, 1987

[54] PARACHUTE QUICK RELEASE COUPLING

[75] Inventor: John D. Maziarz, Middletown, Conn.

[73] Assignee: Capewell Components Company Limited Partnership, Hartford, Conn.

[21] Appl. No.: 846,948

[22] Filed: Apr. 1, 1986

[51] Int. Cl.4 ............................................. B64D 17/32
[52] U.S. Cl. .................................. 244/151 A; 24/637; 24/645; 24/574
[58] Field of Search ........... 244/151 R, 151 A, 151 B; 24/574, 633, 306, 636, 637, 643, 644, 645; 292/173, 143

[56] References Cited

U.S. PATENT DOCUMENTS 3,200,463  8/1965  Craven et al. ...................... 24/645
3,453,702  7/1969  Alofs ................................. 24/637
4,098,101  7/1978  Svoboda ........................... 292/143

FOREIGN PATENT DOCUMENTS 1040269  8/1966  United Kingdom .......... 244/151 A

Primary Examiner—Galen Barefoot
Attorney, Agent, or Firm—Chilton, Alix & Van Kirk

[57] ABSTRACT

A parachute quick release coupling having overlying and underlying coupling members and a latching mechanism pivotally mounted on a lower upstanding lug of the underlying coupling member to be withdrawn outwardly and downwardly from a normal latching position thereof overlying the upper coupling member to release the coupling and then eject the latching mechanism from the underlying coupling member.

6 Claims, 7 Drawing Figures

PARACHUTE QUICK RELEASE COUPLING

BACKGROUND AND SUMMARY OF THE INVENTION

The present invention relates generally to couplings and more particularly to a new and improved quick release coupling having notable utility as a parachute coupling for connecting and quickly releasing a parachute canopy.

In prior parachute quick release couplings, after the coupling is released, the coupling latching mechanism protrudes outwardly from the coupling member remaining on the wearer. The protruding latching mechanism is susceptible to entanglement with or damaging other objects and presents a potential danger to the wearer. When using a parachute in a military operation against an enemy, the wearer may be subjected to additional risk of exposure to the enemy due to entanglement of the latching mechanism with other equipment, trees, etc. When using a parachute to land in water, the protruding latching mechanism may puncture a pneumatic life vest or pneumatic life raft, for example when the wearer is boarding the life raft.

It is a principal object of the present invention to provide a new and improved parachute quick release coupling which after release of the coupling does not encumber the wearer with undesirable and potentially dangerous protrusions.

Another object of the present invention is to provide a parachute quick release coupling which affords a simple and quick uncoupling operation and automatic ejection of the latching mechanism.

A further object of the present invention is to provide a coupling of the type described which is safe and reliable in its normal or coupled mode.

A still further object of the present invention is to provide a coupling of the type described which will successfully support substantial load without being accidentally released and yet which may be simply and easily released.

Yet another object of the present invention is to provide a coupling of the type described having a durable and compact construction.

Other objects will be in part obvious and in part pointed out more in detail hereinafter.

DESCRIPTION OF THE PREFERRED EMBODIMENT

Figure 1:
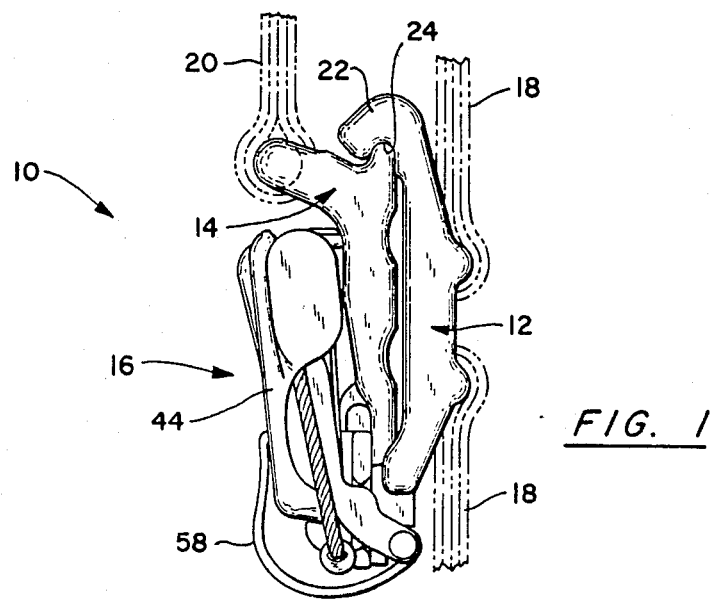
FIG. 1 is a side view of a preferred embodiment of a parachute quick release coupling of the present invention showing the coupling interconnecting a parachute harness and parachute canopy riser.

Although a specific form of the present invention has been selected for illustration in the drawings and the following description is written in specific terms for the purpose of describing the illustrated form of the invention, the drawings and description are not intended to limit the scope of the invention which is defined in the appended claims.

Referring to the drawings, a preferred embodiment 10 of the quick release coupling of the present invention shown in the drawings constitutes an improvement over the coupling disclosed in U.S. Pat. No. 3,200,463 of Wilbur J. Craven et al, dated Aug. 17, 1965 and entitled "Quick-Release Connector". Except as described otherwise herein, the quick release coupling 10 may be identical to the coupling disclosed in U.S. Pat. No. 3,200,463, and therefore the disclosure of U.S. Pat. No. 3,200,463 is incorporated herein by reference.

Figure 3:
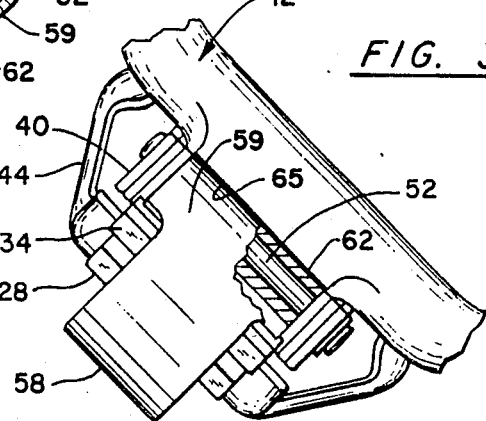
FIG. 3 is an enlarged partial transverse section view, partly broken away and partly in section, of the coupling showing additional details of the pivot bearing.
Figure 4:
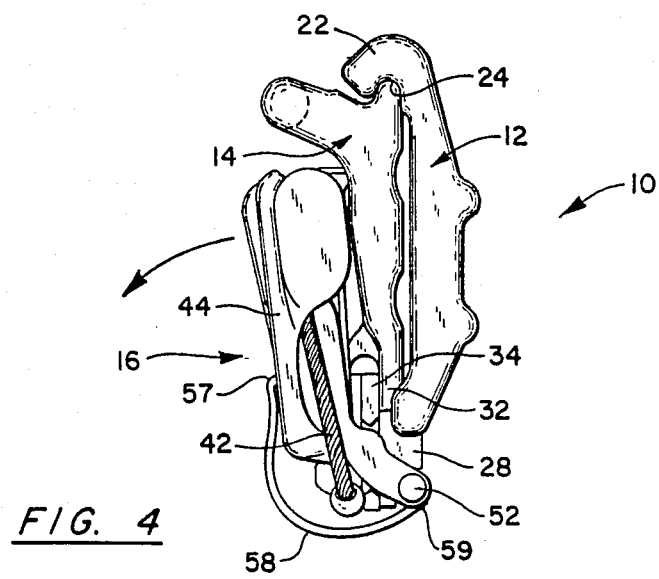
FIG. 4 is an enlarged side view of the coupling similar to FIG. 1, further showing the direction which the coupling is opened to release the coupling.
Figure 5:
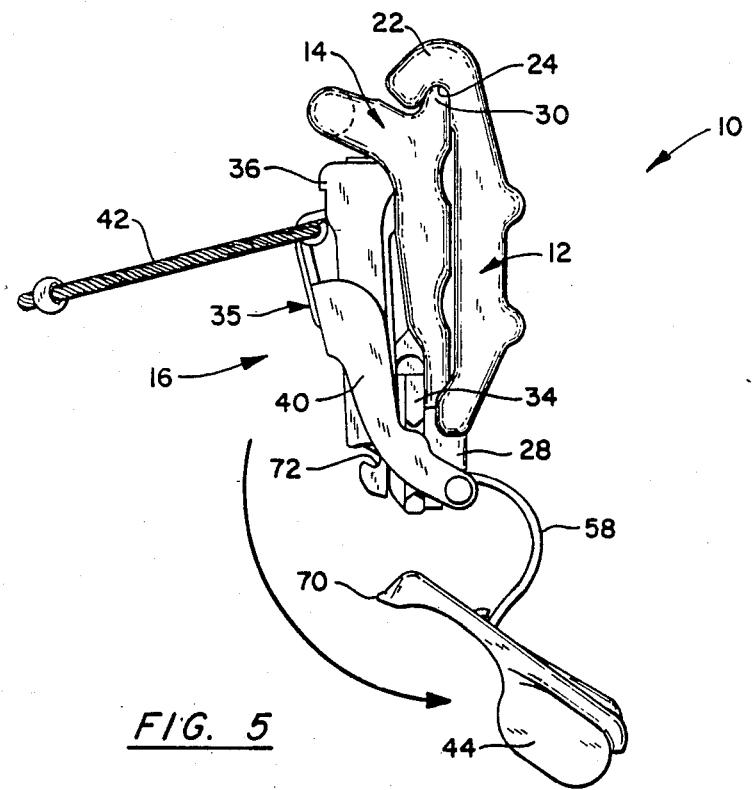
FIGS. 5–7 are enlarged side views similar to FIG. 3, showing the coupling at successive phases of release.
Figure 6:
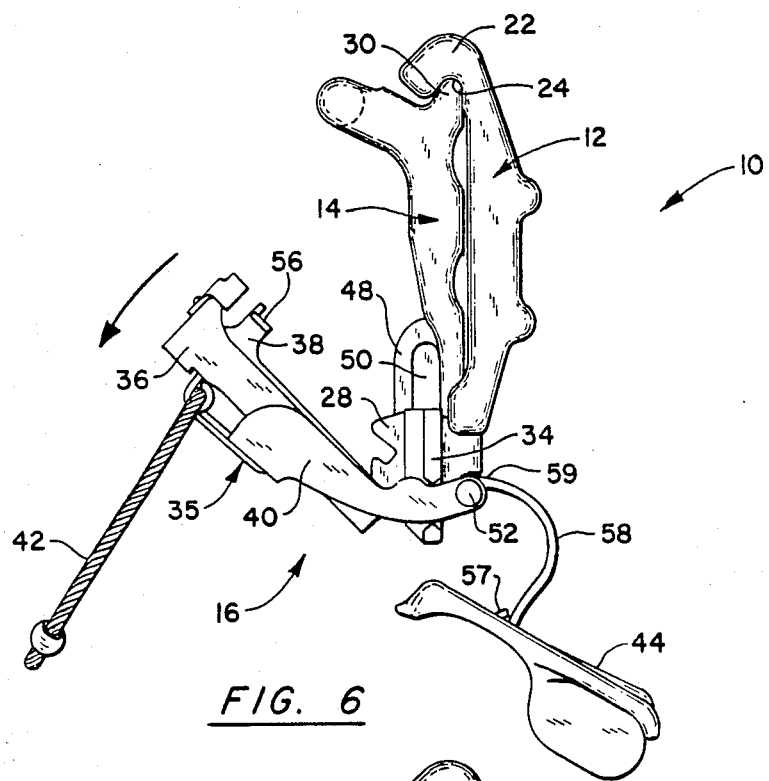
Figure 7:
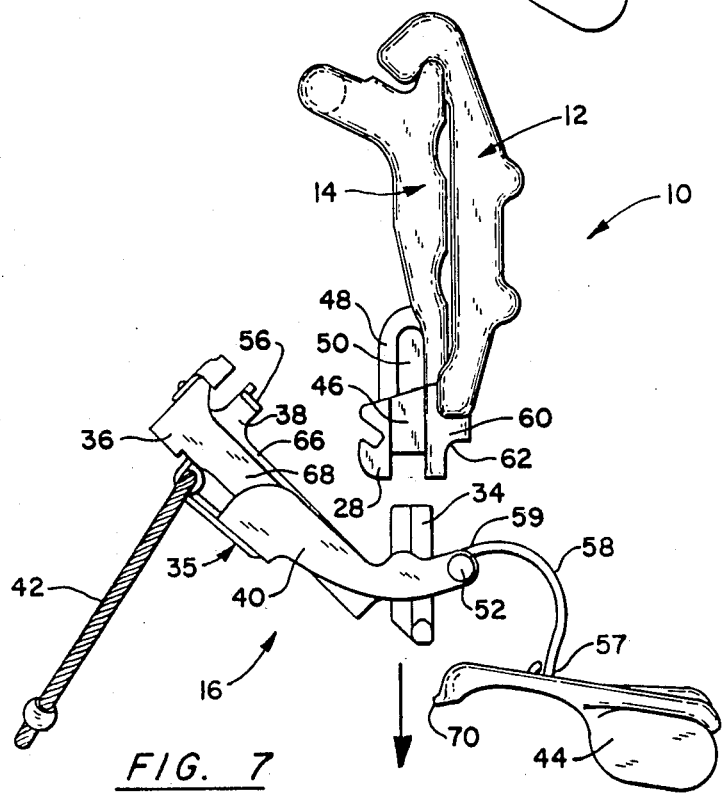

The coupling 10 generally comprises an underlying or base coupling member 12, an overlying or outer coupling member 14 and a releaseable latch mechanism 16 mounted on the base member 14 and having a normal or nested position overlying the outer member 14 as shown in FIGS. 1 and 3 for retaining the coupling members 12, 14 in coupled relationship. Although only one coupling 10 is shown and described herein, a parachute harness typically has a coupling 10 at each side of the harness and both couplings 10 must be released to release the parachute canopy (not shown). In a conventional manner, the underlying member 12 is secured to the straps 18 of the parachute harness and the overlying member 14 is secured to a canopy riser 20 of the parachute canopy. Thus, the coupling 10 forms a link for connecting the canopy riser 20 to the parachute harness. Upon actuation of the latch mechanism 16 of each coupling 10, its outer member 14 is quickly released to separate the parachute canopy from the harness.

As described more particularly in U.S. Pat. No. 3,200,463, the base member 12 has an upper, outwardly and downwardly projecting end flange 22 providing a downwardly opening, concave bearing or groove 24 extending transversly substantially the full width of the base member 12. At the opposite or lower end of the base member 12, an upstanding central lug 28 is provided for mounting the latch mechanism 16. The outer member 14 has an upper lip 30 adapted to pivotally engage the bearing 24 of the base member 12 and a lower end 32 received within a recess in the base member 12 immediately above the lower upstanding lug 28.

The latch mechanism 16 comprises a U-shaped latch slide 34 for latching the outer coupling member 14 to the base member 14, a lever mechanism 35 comprising a latch operating lever 36 for reciprocating the latch slide 34 between its latched and unlatched positions, a latch latch lever 38 nested within the operating lever 36 and a latch latch release lever 40 (in which the latch operating lever 36 is nested) for unlatching the latch latch lever 38, a lanyard 42 attached to the latch latch release lever 40 and a safety cover 44 for covering and protecting the lanyard 42 and release lever 40 against inadvertent operation.

In the latched condition of the coupling 10 shown in FIGS. 1 and 3, the latch slide 34 overlies and engages the lower end 32 of the outer member 14. Upon downward retraction of the latch slide 34 to its unlatched position out of engagement with the outer member 14, the outer member 14 is released to pivot freely about the bearing 24 and separate from the base member 12.

The latch slide 34 is loosely trapped between three pairs of inner parallel arms of the three nested levers 36, 38, 40 of the lever mechanism 35. The latch slide 34 is thereby connected to be shifted between its upper latching position and lower withdrawn position by pivotal operation of the latch operating lever 36. The lower upstanding lug 28 has a generally T-shaped cross section forming parallel guide slots 46 adapted to receive and guide the parallel legs of the U-shaped latch slide 34. The lower end 32 of the outer coupling member 14 also has an upstanding generally T-shaped lug 48 forming shallow slots 50 aligned with the guide slots 46 for receiving the latch slide 34 when it is shifted upwardly into locking position.

The lever mechanism 35 is mounted for pivotal movement about its lower pivotal end. The parallel arms of the lever mechanism 35 are interconnected at their lower ends by a pivot pin 52 about which the lever mechanism 35 is pivoted from its latching position overlying the outer member 14 to its withdrawn position disposed generally outwardly from the base member 12.

The latch latch lever 38 releaseably retains the operating lever 36 in its overlying latching position, thereby to retain the slidable latch 34 in its latching position. The latch latch lever 38 is nested within the operating lever 36 and suitably secured to the lower end of the outer face of the operating lever, for example by rivets (not shown). As more particularly described in U.S. Pat. No. 3,200,463, the latch latch lever 38 has a pair of flexible and resilient latch latch arms 66 which extend along the inner sides 68 of the operating lever 36 and which have laterally inwardly extending cam fingers at their upper ends. The latch latch arms 66 have side projections 56 adapted to resiliently engage opposed slots in the outer member 14 to latch the latch latch lever 38 to the outer member 14 and therefore latch the operating lever 36 in its latching position overlying the coupling members 12, 14.

The release lever 40 overlies the operating lever 36 and is mounted for limited pivotal movement relative to the operating lever 36. As more particularly described in U.S. Pat. No. 3,200,463, the release lever 40 has an upper triangular tab extending inwardly through a slot in the operating lever 36 and forming a pair of converging camming members that are engageable with the cam fingers of the latch latch lever 38 to withdraw the latch arms 66 inwardly upon limited outward pivotal movement of the release lever 40 relative to the latch latch lever 38. Such outward pivotal movement of the release lever 40 operates to release the latch latch lever 38 to permit the operating lever 36 to be pivoted outwardly and downwardly to withdraw the latch slide 34 and release the coupling 10.

To facilitate pivoting the release lever 40 and operating lever 36 to effect separation of the coupling members 12, 14, a "pop-up" lanyard 42 is fixed to the upper end of the release lever 40. The lanyard 42 provides means for manually withdrawing the release lever 40 to withdraw the latch arms 66 inwardly and release the latch latch member 38 and then pivot the operating lever 36 outwardly and downwardly.

A safety cover 44 secures the lanyard 42 in a nested position so as to preclude accidentally pulling the lanyard. Also, the safety cover 44 is dimensioned and configured to substantially enclose the release lever 40 and is connected to the pivot pin 52 via an interconnecting resilient link or strap 58. The upper end 57 of the strap 58 is pivotally connected to the cover 44 above a lower pivotal edge 70 of the cover. The strap 58 is formed with a generally cylindrical lower end 59 which surrounds the pin 52 and which extends substantially the full length of the pivot pin 52 between the inner parallel lever arms of the latch latch lever 38. For mounting the cover 44 in its closed position, the lower edge 70 of the cover 44 is positioned in a transverse groove 72 in the outer face of the upstanding lug 28 and the safety cover 44 is pivoted upwardly and inwardly into overlying relationship with the release lever 40 and lanyard 42 where the cover is held by an overcenter bias provided by the resilient strap 58. The safety cover 44 can be manually withdrawn from its closed position by pivoting the cover 44 outwardly and downwardly. The lanyard 42 will then "pop up" to an upright position where it can be easily grasped.

Figure 2:
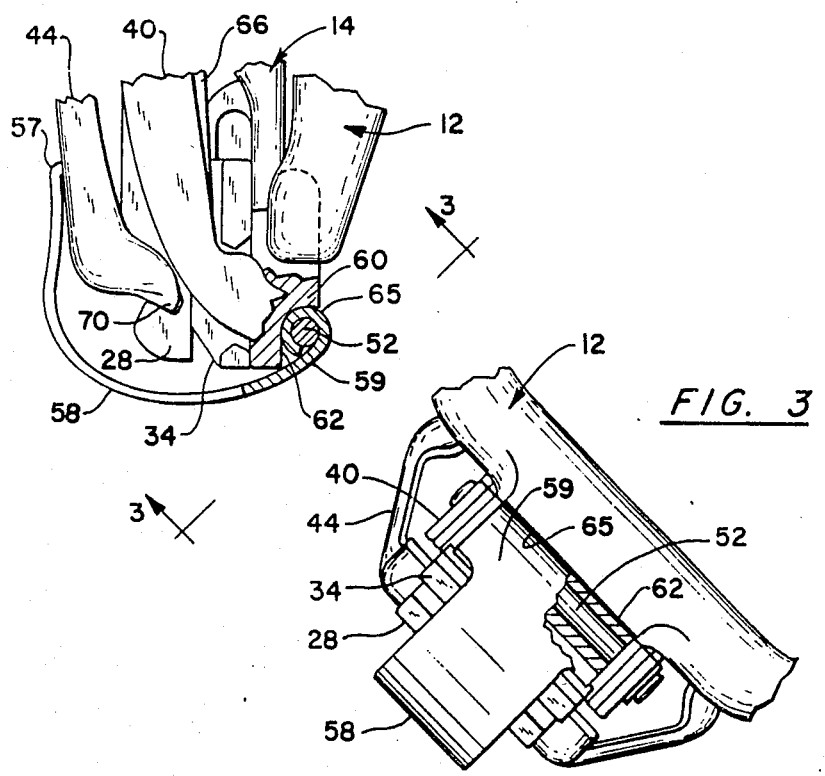
FIG. 2 is an enlarged partial side section view, partly broken away and partly in section, of the coupling, showing a pivot bearing of a latching mechanism of the coupling.

Referring to FIGS. 2 and 3, the lower end 60 of the upstanding lug 28 is formed with a transverse concave bearing surface 62 for engagement by the generally cylindrical lower end 59 of the strap 58 which encircles the pivot pin 52. The bearing surface 62 thereby acts as a concave bearing for the pivotal bearing 65 provided by cylindrical lower end 59 and to permit independent pivotal movement of the strap cover 58 and lever mechanism 35. The concave bearing surface 62 faces downwardly and inwardly and provides a bearing surface for the upward and outward forces produced by the resilient strap 58 and transmitted via the pivot bearing 65 to the base member 12.

Thus, with the coupling 10 engaged, the pivot bearing 65 of the lever mechanism 16 engages the concave bearing surface 62 and the latch slide 18 overlies and engages the lower end of the outer member 14. After disengagement of the latch latch member 38 by the lanyard 42, the operating lever 36 is pivoted by the lanyard 42 outwardly and downwardly so as to retract the latch member 34 and release the coupling. The lower end of the lever mechanism 35 is then free to separate from the base member 12. The outward and downward movement of the lever mechanism 35 produced by pulling the lanyard 42 will naturally carry the lever mechanism 35 downwardly out of engagement with the base member 12 to automatically separate the latch mechanism 16 and eject the latch mechanism 16 from the base member 12.

The base member 12 has no significant outward protrusions and so that, upon separation of the outer member 14 from the base member 12 and disengagement of the latch mechanism 16 from the base member 12, there are no significant protrusions remaining on the coupling to become caught or entangled with other objects. Accordingly, a quick release coupling is provided which affords a simple and quick uncoupling operation with automatic ejection of the latching mechanism from the harness and which after uncoupling does not leave any undesirable and potentially dangerous protrusions. The safety and convenience of the user are thereby enhanced.

As will be apparent to persons skilled in the art, various modifications and adaptations of the structure above described will become readily apparent without departure from the spirit and scope of the invention, the scope of which is defined in the appended claims.

I claim:

1. In a parachute quick release coupling having a base coupling member adapted to be attached to a parachute harness and a separate outer coupling member adapted to be attached to a parachute canopy riser, the base and outer members, when coupled together, having lower portions in cooperative relationship and upper portions interlocking to permit releasing the coupling by releasing said cooperative relationship; and a latching mechanism having a latch shiftable between an upper latching position thereof latching said lower portions in said cooperative relationship and a lower release position thereof releasing said cooperative relationship, the base member having guide means for guiding the latch between its said upper and lower positions, a lever mechanism having transversely spaced arms with an interfitting relationship with the latch and pivotal about a transverse axis at the lower end thereof to shift the latch downwardly to its lower position by pivotal movement of the lever mechanism outwardly and downwardly from an operating position thereof overlying the outer member, a lanyard connected to the lever mechanism for pivoting the lever mechanism outwardly and downwardly with the lanyard to release the coupling, a protective cover having a lower edge portion pivotal on the base member to pivot the cover to a closed position thereof overlying the lanyard and lever mechanism, a pivot pin interconnecting the transversely spaced arms of the lever mechanism and providing said transverse pivotal axis of the lever mechanism, and a resilient strap having a lower end portion at least partly surrounding the pivot pin and an upper end portion connected to the cover above its said lower edge portion and providing an overcenter resilient bias for retaining the cover on its said closed position, the improvement wherein the lever mechanism has a transverse pivot bearing underlying the base member at the lower end thereof and wherein the base member has, adjacent its lower end, a concave, transverse bearing surface providing a bearing engageable by the pivot bearing to pivotally support the latching mechanism in the operating position thereof on the base member against upward and outward movement and opening downwardly and inwardly to permit downward withdrawal of the pivot bearing and therefore downward withdrawal of the latching mechanism to provide for automatically ejecting the latching mechanism from the base member when the coupling is released by pivoting the lever mechanism outwardly and downwardly from its operating position with the lanyard.

2. A parachute quick-release coupling as defined in claim 1, wherein the pivot bearing comprises said lower end portion of the resilient strap has a generally cylindrical end portion at least partly surrounding the pivot pin and extends substantially the full transverse width between the transversely spaced arms of the lever mechanism and said concave bearing surface extends, and is engaged by said lower end portion, substantially the full transverse width of said lower end portion.

3. A parachute quick release coupling according to claim 1 wherein the lever mechanism has latch latch means, which in said overlying position of the lever mechanism, latches the lever mechanism to the outer member, the lanyard being connected to release the latch latch means in conjunction with pivoting the lever mechanism outwardly and downwardly with the lanyard.

4. In a parachute quick release coupling having a base coupling member and a separate outer coupling member overlying the base coupling member in the coupled condition thereof, the base and outer coupling members having, in their said coupled condition, lower portions in cooperative relationship and upper portions interlocking to release the coupling by releasing said cooperative relationship; and a latching mechanism-having a latch member mounted on the base member and shiftable between a latching position thereof latching said lower portions in said cooperative relationship and a withdrawn position releasing said cooperative relationship, a lever mehanism having transversely spaced arms, a pivot pin interconnecting the transversely spaced arms, the lever mechanism being connected to the latch member and pivotal about the pivot pin axis to shift the latch member from its latching position to its withdrawn position by pivotal movement of the lever mechanism outwardly and downwardly from an operating position thereof overlying the outer coupling member, the lever mechanism having latch latch means for latching the lever mechanism to the outer member in said overlying operating position of the lever mechanism, release means connected to the lever mechanism for disengaging the latch latch means and for pivoting the lever mechanism outwardly and downwardly to shift the latch member to its withdrawn position; a cover having a lower edge portion pivotal on the base member to pivot the cover to a closed position thereof overlying the release means and a connector connected to the cover above its said lower edge portion and to the pivot pin to provide an overcenter resilient bias for normally retaining the cover in its said closed position, the improvement wherein the base member has adjacent its lower end, a concave, transverse bearing surface and the lever mechanism has a transverse pivot bearing engageable with said concave bearing surface to pivotally support the latching mechanism in the operating position thereof on the base member against upward and outward movement, the concave bearing surface of the base member opening downwardly to permit downward withdrawal of the pivot bearing and therefore downward withdrawal of the latching mechanism to provide for automatically ejecting the latching mechanism from the base member when the coupling is released by pivoting the lever mechanism outwardly and downwardly from its said overlying operating position with said release means.

5. A parachute quick release coupling as defined in claim 4 wherein said connector has a generally cylindrical lower end portion at least partly surrounding the pivot pin and providing the pivot bearing engageable with said bearing surface of the base member.

6. A parachute quick release coupling as defined in claim 5 wherein said generally cylindrical lower end portion of the connector extends substantially the full length of the pivot pin between the transversely spaced arms of the lever mechanism.

* * * * *